Figure 1:
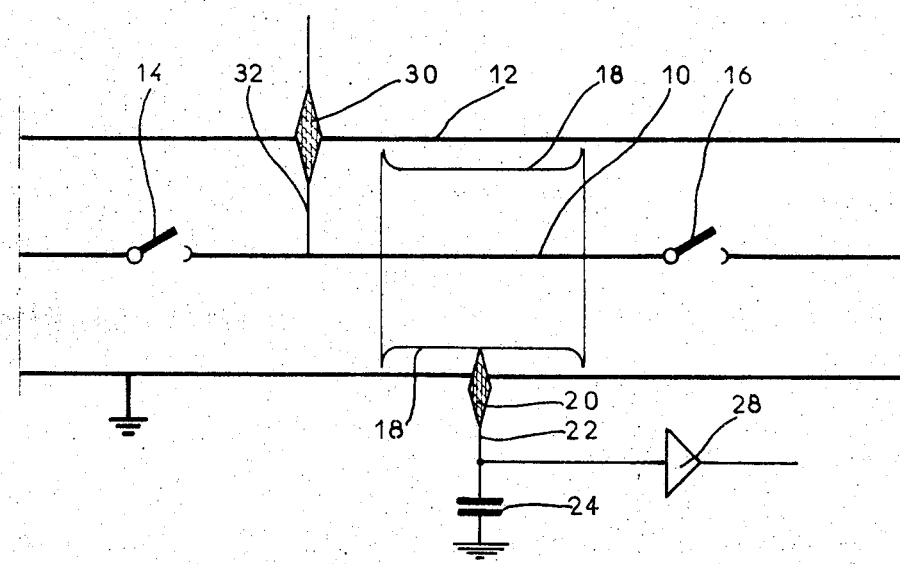

United States Patent

Amalric

[15] 3,701,944
[45] Oct. 31, 1972

[54] HIGH-VOLTAGE METAL-CLAD APPARATUS COMPRISING A CAPACITIVE VOLTAGE DIVIDER

[72] Inventor: Jean E. Amalric, Grenoble, France
[73] Assignee: Merlin Gerin, Grenoble, France
[22] Filed: Aug. 3, 1971
[21] Appl. No.: 168,694

[30] Foreign Application Priority Data

Aug. 6, 1970 France.....................7029159

[52] U.S. Cl. ..............324/126, 174/11 BH, 324/74,
                                                        339/177 R
[51] Int. Cl. ..........................G01r 1/20, G01r 35/02
[58] Field of Search ...324/126, 74, 149, 72.5, 158 P;
                174/11 BH; 339/177 R, 147 R, 147 P

[56] References Cited

UNITED STATES PATENTS 2,199,757   5/1940   Rohde.....................324/126
2,805,399   9/1957   Leeper....................339/177

*Primary Examiner*—Rudolph V. Rolinec
*Assistant Examiner*—Ernest F. Karlsen
*Attorney*—Stevens, Davis, Miller & Mosher

[57] ABSTRACT

High-voltage metal-clad apparatus comprising a pressurized grounded metal enclosure and an axial high voltage conductor. A capacitive voltage divider cooperates with a section of the conductor that can be isolated to deliver a low voltage output signal. A movable probe can apply a test voltage to the conductor to calibrate the voltage divider in situ. The probe is voltage-supplied through a bushing traversing the enclosure and rated only for a fraction of the rated high voltage of the apparatus.

5 Claims, 4 Drawing Figures

PATENTED OCT 31 1972 3,701,944

SHEET 1 OF 2

HIGH-VOLTAGE METAL-CLAD APPARATUS COMPRISING A CAPACITIVE VOLTAGE DIVIDER

The present invention relates to a high voltage metal-clad apparatus comprising a pressurized grounded metal enclosure and an axial high-voltage conductor.

High-voltage distribution or switching stations, in which the apparatus (switches, circuit breakers, etc.) is arranged in grounded metal jackets filled with a compressed gas of high dielectric strength and possibly high arc-extinguishing power such as sulfur hexafluoride, are now well-known and being more and more used due to their small size and their reliability, particularly in urban centers.

Conventional measurement transformers or capacitive dividers have been incorporated in these stations in order to measure the voltage of the screened network with the necessary precision and to be able to control all protective relays. In the case of capacitive dividers, recourse has been had to a plurality of capacitors of relatively high capacitance which have been connected in series between the high voltage conductor and the jacket in order to tap off a reduced voltage from a part of the capacitors. These conventional magnetic transformers and capacitive dividers are bulky and expensive so that the manufacturers have contemplated their replacement by a device which is more adapted to the nature of screened stations. It was found that the concentric arrangement traditionally adopted for the different members of the station is also possible for a capacitive divider: It is sufficient to arrange a cylindrical electrode between the axial conductor and the inner wall of the jacket and to cause to extend from the jacket, via an insulating lead-through, a conductor which is connected to said electrode on the one end and to one of the terminals of an outer capacitor, the other terminal of which is connected to the jacket, on the other end, in order to have a faithful image of the high voltage of the axial conductor.

As a matter of fact, if the said electrode which constitutes a plate of the capacitive divider is suitably arranged between the axial conductor and the jacket, the low voltage which appears at the terminals of the outer capacitor faithfully reproduces the high voltage to be measured by being proportional to it.

The increase in size of the screened station due to the presence of such a capacitive divider is only slight, if any, and the cost of this divider is far less than that of the traditional types. Unfortunately, the capacitance of the inner electrode with respect to the axial conductor is very low — of the order of a few picofarads — so that the low power level resulting therefrom, particularly with respect to the consumption of the protective relays, compels the user to have recourse to electronic amplifiers of high current gain capable of delivering an output voltage proportional or identical to the input voltage tapped from the outer capacitor, but under low impedance.

A high precision of measurement can easily be obtained with this arrangement provided that one calibrates the ratio of the capacitive divider with amplifier connected, which may be effected by application of a known alternating voltage to the axial conductor, previously insulated from the network, and by thereupon measuring the voltage at the input and output of the amplifier. However, while for a given arrangement this calibration can possibly be effected before the filling of the envelopes with the compressed gas, its value, in view of the high degree of precision required for the measurement, becomes doubtful after the final mounting of the envelopes and the filling of them with the compressed gas from which there can easily result slight displacements or deformations of the constituent elements of the capacitive divider resulting in a modification of the capacitances. The same is true of the outer components and in particular of the amplifier, the aging and possible replacement of which make the initial calibration very unreliable.

The adoption of the said divider therefore depends on the possibility of calibration during the use of the installation. Now, the inaccessibility of the parts under voltage of a screened station of the type mentioned has not made it possible up to now to process with such calibrations in operation and for this reason the measurement system with capacitive divider with concentric electrode has never found application, despite its simplicity.

One could contemplate calibration of the system by means of a voltage transformer connected to the supply cable of the station in question. Unfortunately, the core of this cable is frequently accessible only at a great distance from the screened station, for instance several kilometers away in the case of urban stations fed by an external station with overhead lines located outside centers of population. One then has no certainty that the voltage measured at a remote distance corresponds to the voltage at the place of the screened station.

The object of the present invention is to create a screened station comprising a capacitive divider of the type mentioned having simple, strong and inexpensive means for permitting the rapid and precise calibration of the divider without affecting the hermetic nature of the metal envelopes and without therefore making the emptying thereof necessary.

In the screened station in accordance with the invention the said envelope comprises an insulating lead-through insulated for a fraction of the nominal voltage of the station in order to permit a moving contact to reach the said conductor without destroying the seal of the envelope at a point of the conductor capable of being insulated from the network in order to apply to it a divider calibrating voltage.

In accordance with one development of the invention, the said moving contact consists of the moving contact of a grounding switch which is duly insulated from the said metal envelope.

The fact of insulating the said contact from the envelope for only a fraction of the world rated voltage of the station, for instance for 10 kV in a 220 kV installation, makes it possible to obtain the desired result with inexpensive means and small size.

Figure 2:
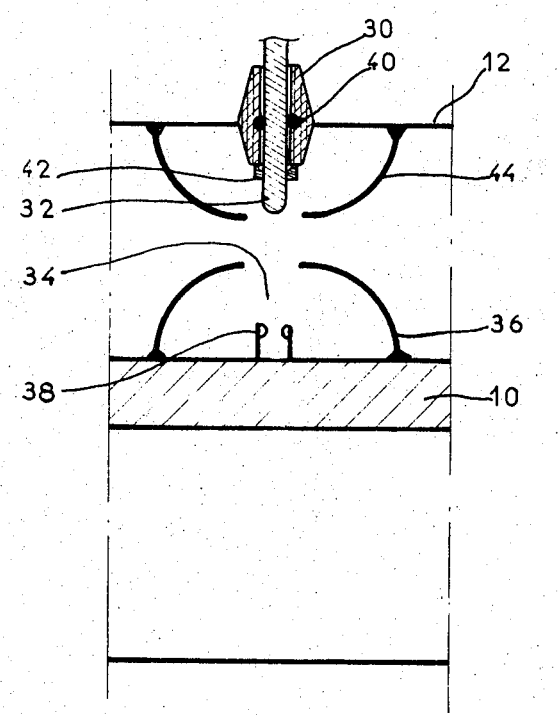
Figure 3:
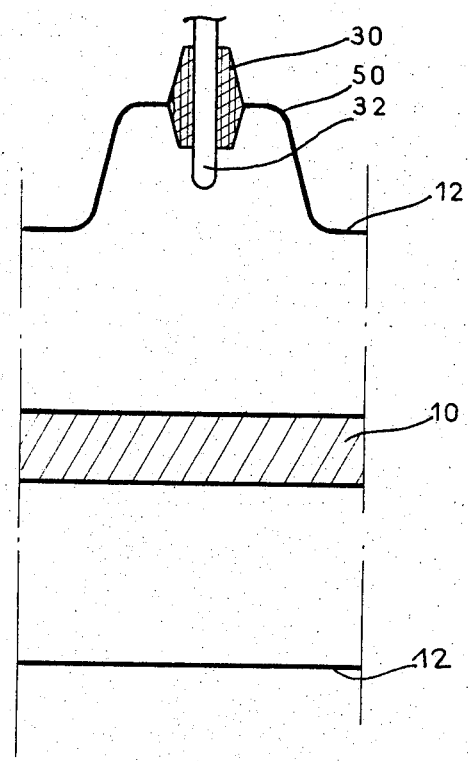
Figure 4:
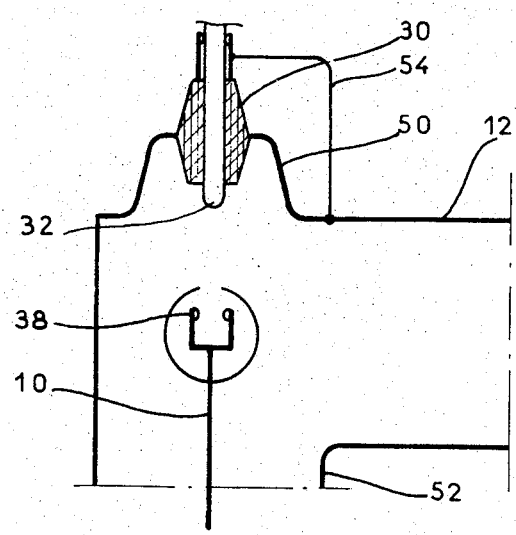

A few embodiments of the invention will now be described by way of illustration and not of limitation as shown schematically in the accompanying drawings in which:

FIG. 1 is a schematic view in axial section of an enclosure in accordance with the invention which forms part of a screened installation, and FIGS. 2 to 4 show different variants also schematically in axial section.

In FIG. 1, a high-voltage conductor 10 is arranged in the axis of a cylindrical metal envelope or jacket 12. The specific formation and arrangement of this envelope and of this axial conductor do not constitute part of the invention and will therefore not be described in detail. It is sufficient to point out that the jacket may be formed of compartmented or non-compartmented sections. The enclosure defined by the jacket 12 is filled with a compressed gas having a high dielectric strength and preferably also a higher arc extinguishing power in the event that the station comprises screened disconnecting switches such as section switches or circuit breakers. This gas may be an electro-negative gas such as sulfur hexafluoride ($SF_6$) or simply compressed air.

Two screened disconnecting switches 14 and 16 make it possible to isolate the central section of the conductor 10 which is supported within the jacket 12 by suitable insulators (not shown) which do not form part of the invention. These screened disconnecting switches may be switches with axially movable contact rod, but switches of a different type can be provided. Their envelopes may be arranged in the extension of the envelope 12 of the central section or else at an angle (for instance 90°) with respect to the latter. For the isolating of the section in question of the conductor 10 there will preferably be used switches normally specified for the installation, located at a sufficient distance from said section not to introduce any appreciable error in the calibration. The jacket 12 is grounded in the customary manner.

An annular metal screen 18 is arranged concentrically between the conductor 10 and the inner wall of the jacket 12 in the vicinity of said wall but electrically insulated from it. An insulating lead-through 20 arranged in the jacket 12 supports on the one hand the screen 18 and on the other hand a conductor 22 arranged in its axis to make it possible to tap off the voltage of the electrode 18 and apply said voltage to one of the terminals of an external measuring capacitor 24 whose other terminal is grounded at 26. The conductor 22 is connected to the input of a suitable amplifier 28 which in known manner feeds measuring instruments, protective relays, etc. In accordance with the invention, a second insulating lead through 30 passes through the jacket 12 to permit a moving contact 32, by a radial movement with respect to the envelope, to reach the conductor 10 in order to apply to it a predetermined calibration voltage without interrupting the seal of the jacket 12. This calibration voltage is substantially less than the nominal operating voltage of the station, which makes it possible to provide a lead-through insulator 30 of reasonable size and cost.

The amplifier 28 is necessary in order to be able to provide an output voltage which is identical or proportional to its input voltage, supplied by the capacitor 24, but at low impedance. As a matter of fact, since the capacitance of the screen 18 with respect to the conductor 10 is very low, the impedance of the divider comprising said capacitance and that of the capacitor 24 (with the plate 18 in common) is very high so that the divider is incapable of feeding receivers of relatively low impedance.

This device operates in the following manner:

The moving contact 32 being normally in its withdrawn position, it is brought onto the conductor 10 after the central section of the high voltage axial conductor 10 has been electrically isolated from the network, by the opening of the two disconnecting switches 14 and 16, which are suitably selected.

A suitable alternating voltage (for example of the order of 5 percent of the rated voltage) is then applied to the closed contact 32 and therefore to the conductor 10, and by means of a measurement bridge provided with a zero indicator and a potentiometer, the ratio of the voltages at the terminals of the capacitor consisting of the plate 18 and the conductor 10 and at the terminals of the outer capacitor 24 is determined in known manner. The calibration having been effected, the contact 32 is removed and the installation is ready or again ready to operate normally.

It is advisable to use an amplifier 28 which has a gain control system which makes it possible to adjust the input voltage/output ratio to a predetermined rated value during the calibration.

The ratio measured will characterize the entire capacitive divider as long as no change is made on the capacitances in question, including the input capacitance of the amplifier 28.

In case of the replacement of the amplifier or of any change made in the station which might result in a modification of the other capacitances in question, a recalibration will be effected before the station is again placed in operation.

FIGS. 2 to 4 show various possibilities for the execution of the calibration switch 32 with lead-through 30. In the different figures 1 to 4, identical reference numbers designate identical or similar elements.

In FIG. 2, the moving contact 32 passes through an opening 34 provided in an electorstatic electrostatic 36 connected to the conductor 10 and intended to avoid disturbance of the electrostatic field by a fixed contact 38 which is rigidly connected with the conductor 10 and cooperates with the moving contact 32. The seal of the lead-through 30 is formed by at least one toroidal joint 40 and by a valve 42 rigidly connected with the moving contact 32 and which places itself, assisted by the pressure prevailing within the enclosure, on a seat provided on the inner end of the lead-through 30 in open position of the contact 32.

A second equipotential screen 44 surrounds the contact 32 to impose a homogenized electrostatic field around the open contact 32.

In FIGS. 3 and 4, the lead-through 30 is arranged in the axis of a boss 50 of generally frustoconical shape of the jacket 12 which makes it possible to avoid the screen 44. In FIG. 4, this boss 50 is opposite the end of a jacket 52 at the intersection of two tubules which are perpendicular to each other.

In accordance with a preferred embodiment of the invention, the calibration switch 30, 32 serves at the same time as grounding switch. For this purpose, it is sufficient to isolate the contact 32 in the manner described above, that is to say for a fraction of the rated voltage, and to provide a removable connection 54 (see FIG. 4) such as a braid which makes it possible to connect the contact spindle 32 selectively to ground or to the calibration voltage.

Other embodiments can be course be contemplated without thereby going beyond the scope of the invention.

What is claimed is:

1. Electrical apparatus rated for a predetermined high voltage comprising:
   a. a linearly extending high voltage conductor;
   b. a metal cylindrical enclosure coaxially surrounding and spaced apart from said conductor;
   c. a pressurized dielectric gas in said enclosure;
   d. capacitive voltage divider means including an electrode interposed between said enclosure and a section of said conductor in capacitive association with the latter, a measuring capacitance coupled to said electrode so as to acquire a low voltage when said conductor is high voltage energized, output means connected to said capacitance;
   e. means to isolate said section of said conductor; and
   f. calibrating means to accurately determine the reduction ratio of said capacitive voltage divider means by application of a relatively low test voltage to said section, said calibrating means comprising a withdrawable test probe movable into and out of engagement with said section, and insulating bushing means traversing said enclosure and having a through conductor electrically connected to said probe to apply said test voltage through said probe to said section, said busing means rated for a voltage substantially lower than said predetermined rated high voltage of said apparatus.

2. Apparatus according to claim 1, said bushing means being rated for a voltage substantially not higher than 5 percent of said rated high voltage.

3. Apparatus according to claim 1, further comprising means to ground said probe.

4. Apparatus according to claim 1, said enclosure comprising a dome-shaped outwardly directed projection accommodating said bushing means.

5. Electrical metal-clad apparatus comprising:
   a. a linearly extending conductor rated for a predetermined high voltage;
   b. a metal cylindrical enclosure coaxially surrounding and spaced apart from said conductor;
   c. capacitive voltage divider means delivering a low output voltage of said conductor;
   d. means to isolate a section of said conductor in capacitive relation with said voltage divider;
   e. a calibrating switch including an insulating bushing traversing said enclosure and a movable contact slidably mounted in said bushing and movable into and out of engagement with said section, said bushing being rated for a voltage substantially lower than said predetermined high voltage; and
   f. means to connect said movable contact selectively to ground and to a test voltage.

* * * * *